(12) United States Patent
Turner

(10) Patent No.: US 8,456,060 B2
(45) Date of Patent: *Jun. 4, 2013

(54) VIBRATING ELEMENT FLOW MEASUREMENT APPARATUS

(75) Inventor: Roy Colin Turner, Berkshire (GB)

(73) Assignee: Mobrey Limited, Berkshire (GB)

( * ) Notice: Subject to any disclaimer, the term of this patent is extended or adjusted under 35 U.S.C. 154(b) by 412 days.

This patent is subject to a terminal disclaimer.

(21) Appl. No.: 12/919,096

(22) PCT Filed: Feb. 27, 2009

(86) PCT No.: PCT/US2009/001252
§ 371 (c)(1),
(2), (4) Date: Aug. 24, 2010

(87) PCT Pub. No.: WO2009/110986
PCT Pub. Date: Sep. 11, 2009

(65) Prior Publication Data
US 2011/0012480 A1    Jan. 20, 2011

(30) Foreign Application Priority Data
Mar. 1, 2008 (GB) .................................. 0803901.8

(51) Int. Cl.
*H01L 41/08* (2006.01)
*H01L 41/053* (2006.01)

(52) U.S. Cl.
USPC .......................................... 310/328; 310/324

(58) Field of Classification Search
USPC ............................................ 310/328, 346
See application file for complete search history.

(56) References Cited

U.S. PATENT DOCUMENTS

| | | | |
|---|---|---|---|
| 4,594,584 A | 6/1986 | Pfeiffer et al. | 340/620 |
| 6,188,647 B1 | 2/2001 | Drumheller | 367/165 |
| 6,644,116 B2 | 11/2003 | Getman et al. | 73/290 |
| 2003/0010114 A1* | 1/2003 | Getman et al. | 73/290 R |
| 2004/0056612 A1 | 3/2004 | Kuhny et al. | 318/116 |
| 2010/0327700 A1 | 12/2010 | Turner | 310/342 |
| 2011/0012480 A1 | 1/2011 | Turner | 310/346 |

FOREIGN PATENT DOCUMENTS

| | | |
|---|---|---|
| CN | 1423582 | 6/2003 |
| DE | 102004033311 | 1/2006 |
| EP | 0 810 423 | 12/1997 |
| EP | 2 031 359 A1 | 3/2009 |
| GB | 2150292 | 10/1984 |

(Continued)

OTHER PUBLICATIONS

Search Report for PCT/US2009/001252 filed Feb. 27, 2009; 2 pages.

(Continued)

*Primary Examiner* — J. San Martin
(74) *Attorney, Agent, or Firm* — Westman, Champlin & Kelly, P.A.

(57) ABSTRACT

The invention describes a vibrating element apparatus, preferably in the form of a tuning fork-type contact level transducer, and a method of forming the same. The tines of the transducer are vibrated by piezoelectric elements, which piezoelectric elements are arranged in a stack along with insulators and conductors to allow cyclic electrical signals to be applied thereto. The stack is provided as a sub-assembly allowing ready replacement in the field and 10 without disturbing the installation of the transducer in the plant which it serves.

3 Claims, 3 Drawing Sheets

FOREIGN PATENT DOCUMENTS

| GB | 2 351 805 A | 1/2001 |
|---|---|---|
| WO | WO0195667 | 12/2001 |
| WO | WO 2006/005660 | 1/2006 |

OTHER PUBLICATIONS

Second Chinese Office Action for Chinese Application No. 200980106981.5, dated Apr. 24, 2012, 2 pages.

First Chinese Office Action (with English translation) for Chinese Application No. 200980106981.5, dated Oct. 10, 2011, 10 pgs.

"Notification of Transmittal of the International Search Report and the Written Opinion of the International Search Authority" for PCT/US2009/001246, dated Jul. 28, 2009.

First Chinese Office Action for corresponding Chinese Application No. 200980107323.8, dated Feb. 13, 2012, 4 pages.

First Chinese Office Action (with English translation) for Chinese Application No. 200980106983.4, dated Feb. 13, 2012, 12 pages.

"Notification of Transmittal of the International Search Report and the Written Opinion of the International Search Authority" for PCT/US2009/001262, dated Sep. 14, 2009.

Second Chinese Office Action for Chinese Application No. 200980106983.4, dated Nov. 29, 2012, 6 pages.

\* cited by examiner

VIBRATING ELEMENT FLOW MEASUREMENT APPARATUS

CROSS-REFERENCE TO RELATED APPLICATION

This Application is a Section 371 National Stage Application of International Application No. PCT/US2009/001252, filed Feb. 27, 2009 and published as WO2009/110986 on Sep. 11, 2009, in English, the contents of which are hereby incorporated by reference in their entirety.

FIELD OF THE INVENTION

This invention relates to a novel form of vibrating element apparatus and has been devised, in particular, to provide a vibrating fork-type fluid level transducer. However it will be appreciated by those skilled in the art, that the invention could also be applied to vibrating element apparatus configured to measure density and/or viscosity.

BACKGROUND TO THE INVENTION

Various forms of apparatus including one or more vibrating elements are well is known in the field of plant or process control, one example being a contact fluid level transducer. A typical contact fluid transducer includes a pair of spaced tines mounted on a diaphragm, the diaphragm in turn defining one end of a hollow cylindrical body. The tines are arranged to vibrate at a given frequency, typically their resonant frequency, and vibration is typically effected by displacing the centre of the diaphragm by means of a compressed stack of piezoelectric elements, located within the hollow body, and driven by a cycling voltage. When the vibrating tines are contacted by a fluid, there is a change in the frequency at which they vibrate. By detecting the change in frequency, one can determine when a rising fluid level contacts the tines. Likewise one can detect when a fluid level drops below the level of the tines.

An early example of this type of level detection transducer is described in UK Patent No. 2 150 292. In this device a stack, consisting of piezoelectric elements, insulators and connectors, is compressed against the inner or reverse side of a diaphragm by a compression screw mounted in a bridge piece extending over that end of the stack remote from the diaphragm. The spaced tines extend from the outer or front side of the diaphragm, which diaphragm forms one end of a hollow body in which the piezoelectric stack is located.

The bridge piece is, in turn, mounted on a pair of spaced rod-shaped supports extending from the inner side of the diaphragm and also located within the hollow body.

When the piezoelectric elements in the stack are subjected to a cyclic drive voltage, the same expand and contract between the compression screw and the diaphragm, deforming the diaphragm and causing the tines to vibrate. A problem with existing designs is that, at point of manufacture, the stacks are assembled piece-by-piece into the apparatus. This process is somewhat labour-intensive and, once assembled, the apparatus does not lend itself to repair, particularly on-site repair, in the event of failure in the piezoelectric stack assembly. In the event of failure of any component in the piezoelectric stack, the entire apparatus is either removed and replaced, or removed and returned to a service facility for repair. Whichever the case, the seal between the transducer and the plant must be broken, and the transducer removed from its operating environment. In a significant number of cases, apparatus of this type are installed in industrial plants which are subject to stringent inspection and control. If a device is removed for any reason, when that device is replaced or re-installed, the plant may have to be inspected and approved before normal operation can be re-established. A further problem is that the plant served by the transducer may have to be drained before the transducer can be removed. Whatever the case, transducer failure inevitably causes delay and expense, and may also give rise to health and safety issues.

It is an object of the present invention to address the above mentioned problems; or to provide a method and/or apparatus applicable to vibrating element apparatus, which will at least provide a novel and useful choice.

SUMMARY OF THE INVENTION

Accordingly, in one aspect, the invention provides a method of forming a vibrating element apparatus, said apparatus including:

a wall section having an inner surface and an outer surface;

a diaphragm defining, and closing one end of, said wall section, said diaphragm having an inner surface and an outer surface, the inner surfaces of said wall section and said diaphragm defining a hollow body;

one or more vibrating elements extending from the outer surface of said diaphragm;

a stack comprised of components which include one or more piezoelectric elements, said stack being positioned within said hollow body; and a compression device operable to compress said stack against the inner surface of said diaphragm;

said method being characterised in that it includes configuring said stack as a sub-assembly.

Preferably said method includes positioning at least part of said compression device within said sub-assembly.

Preferably said method further includes mounting one or more thermal compensation elements within said sub-assembly.

In a second aspect, the invention provides a vibrating element apparatus, said apparatus including:

a wall section having an inner surface and an outer surface;

a diaphragm defining, and closing one end of, said wall section, said diaphragm having an inner surface and an outer surface, the inner surfaces of said wall section and said diaphragm defining a hollow body;

one or more vibrating elements extending from the outer surface of said diaphragm;

a stack comprised of components which include one or more piezoelectric elements, said stack being located within said hollow body; and a compression device operable to compress said stack against the inner surface of said diaphragm;

said apparatus being characterised in that said stack is included in a sub-assembly, said sub-assembly being locatable within and removable from said hollow body.

Preferably said sub-assembly further includes at least part of said compression to device.

Preferably said sub-assembly still further includes at least one thermal compensation element.

Preferably said sub-assembly includes a carrier which houses the components comprised in said stack.

Preferably said carrier includes a channel to house wires in electrical contact with said piezoelectric elements.

Many variations in the way the invention may be performed will present themselves to those skilled in the art, upon reading the following description. The description should not be regarded as limiting but rather as an illustration, only, of one manner of performing the invention. Where appropriate any element or component should be taken as including any or all equivalents thereof whether or not specifically mentioned.

BRIEF DESCRIPTION OF THE DRAWINGS

One method of, and apparatus for, reducing the present invention to practice will now be described with reference to the accompanying drawings in which.

DETAILED DESCRIPTION OF WORKING EMBODIMENT

Figure 1:
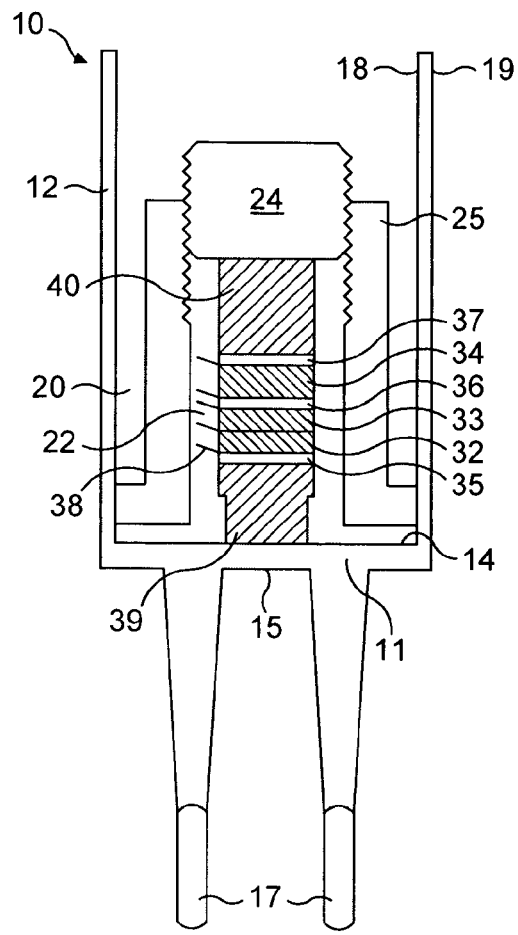
FIG. 1: shows a diagrammatic cross-section through a vibrating element apparatus according to the invention in the form of a contact level transducer, with certain components omitted for clarity.

This invention provides a novel form of vibrating element apparatus which, in the case of the embodiment herein described, comprises a tuning fork-type liquid level detection transducer 10; and a method of forming the same. It will be appreciated, however, that a similarly configured device could be used to measure density and/or viscosity.

In the known manner the apparatus 10 includes a diaphragm 11 integrally formed with, and closing one end of, a cylindrical wall section 12. The diaphragm has an inner surface 14 and an outer surface 15. A pair of tines 17 extend from the outer surface 15.

The wall section 12 has an inner surface 18 and an outer surface 19. The inner surface 14 of the diaphragm and the inner surface 18 of the wall section combine to define a hollow body 20.

Located in the hollow body 20 are one or more piezoelectric elements which, in combination with spacers, insulators, connectors and the like comprise an assembly or stack 22 which is held in compression against the inner surface 14 of the diaphragm by means of a compression device, preferably a compression screw 24. To the extent described thus far, the apparatus is entirely conventional. By applying a cycling voltage to the piezoelectric elements the diaphragm 11 is caused to cyclically deform and, in turn, cause the tines 17 to vibrate.

Though not essential to the implementation of the invention, as described herein the stack 22 is located within a cage 25 and the compression screw 24 is threadably mounted at that end of the cage 25 remote from the diaphragm 11. It can be seen that the cage 25 is located within the hollow body 20 but inwardly of the inner surface 18 of the wall section 12 and is fixed to the inner surface 18 adjacent to the junction between the diaphragm 11 and the wall section 12. As a result, axial expansion or contraction of the wall section 12, when subjected to rapid temperature changes, will not cause the compression on the piezoelectric stack 22 to vary to the extent that the transducer ceases to function—either because the compression is reduced to a degree which does not allow the tines to vibrate, or increased to a level which crushes and destroys the piezoelectric elements, or over-stresses the compression components to such an extent that, when the temperature again rises, the compression components no longer apply the required compression force on the stack 22.

Figure 2:
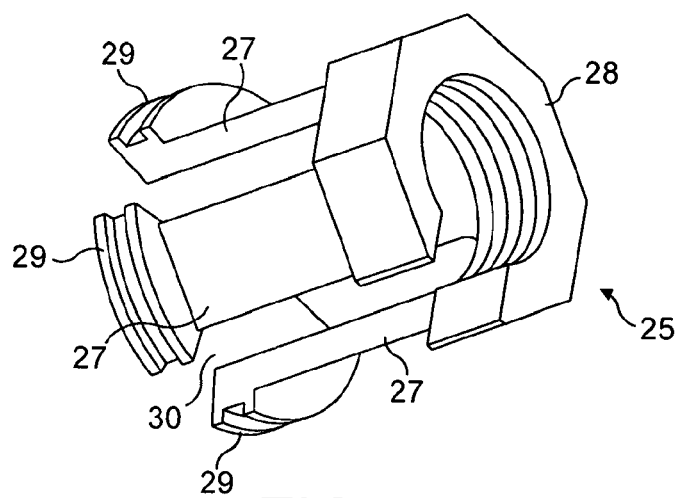
FIG. 2: shows an isometric view of a cage incorporated in the apparatus shown in FIG. 1.

Referring now to FIG. 2, the cage 25 is defined by a plurality of legs 27 extending from one side of a common collar 28. Located at the free end of each leg 27 is a fixing surface part 29, by means of which the cage is fixed to the inner surface 18 of the wall section 12.

It will be noted that the cage 25 shown in FIG. 2 is provided with a slot 30 extending the entire length thereof, the purpose of which will be described in detail below.

A fuller description of the cage 25, and the manner in which the cage is assembled into the hollow body 20, can be found in our co-pending UK Patent Application No. 0803899.4.

In the form shown the stack 22 comprises piezoelectric elements 32, 33 and 34, insulating discs 35, 36 and 37, and a plurality of conducting connectors 38 to carry electrical signals to and from the piezoelectric elements.

In accordance with one aspect of the invention, the stack 22 has associated therewith at least one thermal compensating element which, when subjected to the same temperature gradient, selectively expands or contracts to a greater extent than the components in the stack. If, as shown in WO 01/95667, the stack 22 is compressed between a compression screw mounted directly in the outer wall section 12, and the diaphragm 11, the thermal compensation element(s) will compensate for axial expansion of the outer wall section 12. However if, as shown in the drawings appended hereto, the stack 22 is mounted within cage 25, then the thermal compensating element(s) will compensate for any axial expansion of the cage 25. Whichever of the alternative support structures for the stack is chosen, the provision of the thermal compensation element(s) ensures that the compression applied to the stack 22 remains substantially constant, at least to an extent which allows the instrument to remain operating at temperatures between about −70° C. and about +260° C.

Figure 3:
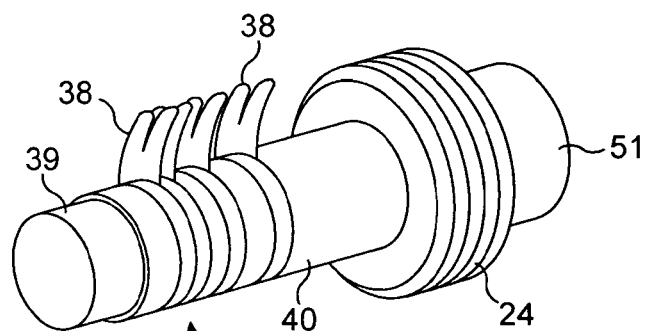
FIG. 3: shows an isometric view of an assembly or stack incorporated in the apparatus shown in FIG. 1.

As shown in FIGS. 1 and 3 it is convenient to provide two thermal compensating elements 39 and 40, one at either end of the stack 22. The elements 39 and 40 preferably comprise plugs of aluminium alloy, plug 39 serving to mount the stack 22 against the diaphragm 11 whilst the plug 40 serves to mount the stack 22 in relation to the compression screw 24. The sizing of the respective plugs can be established empirically according to the material from which they are made, the expansion/contraction characteristics of the stack components, the arrangement and materials composition of the stack support structure, and the temperature range the apparatus is expected to accommodate.

According to another aspect of the embodiment shown in the drawings, the stack and, if appropriate the thermal compensating elements, are held in a sub-assembly or module enabling ready assembly of the apparatus at time of manufacture, and ready replacement of the stack components, in a single step and as a single unit, in the event of failure when in service.

Figure 5:
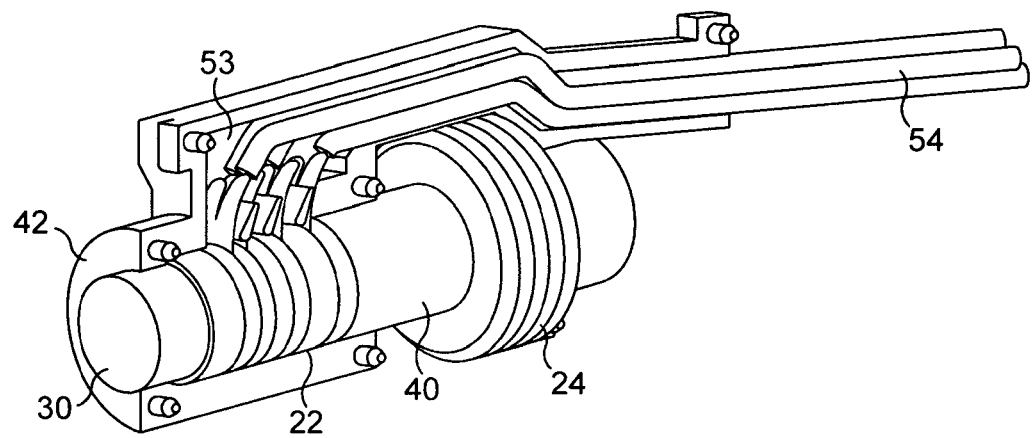
FIG. 5: shows an isometric view of the assembly or stack shown in FIG. 3 located within the component shown in FIG. 4.
Figure 6:
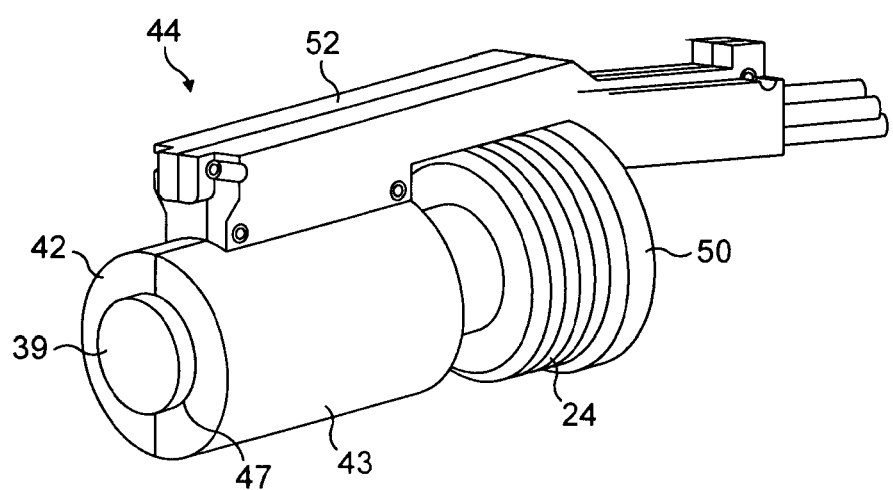
FIG. 6: shows an isometric view of a complete sub-assembly formed by engaging a cover component with that which is shown in FIG. 5.

As can be seen, the stack is preferably mounted into a carrier, the completed form of which is shown at 44 in FIG. 6. As is clearer from FIGS. 4 & 5, the carrier 44 is provided in two halves, one half 42 being shown in FIGS. 4 & 5, the remaining half 43 being shown in FIG. 6. The halves 42 and 43 are substantial mirror images of one another.

Figure 4:
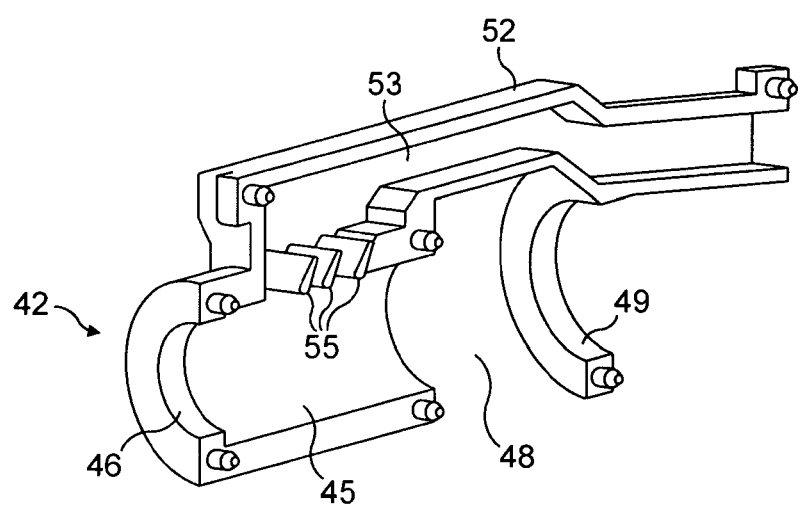
FIG. 4: shows an isometric view of one-half of a carrier for supporting the assembly or stack shown in FIG. 3, within the apparatus shown in FIG. 1.

Referring to FIG. 4, the carrier half 42 includes a first cavity 45 to receive the stack 22 and temperature compensating components 39 & 40, the cavity 45 terminating at one end in a collar 46 which, when the carrier halves 42 & 43 are combined, defines a lower aperture 47 through which the lower thermal compensating element 39 projects. Behind the cavity 45 a space 48 is provided in which the compression screw 24 is received, the space 48 being sized so as to loosely receive the screw 24 but allow the screw to rotate relative to the carrier 44. The distal edge of space 48 is defined by a web 49 which combines with a like member on carrier half 43 to define a collar 50 about a spigot 51 projecting from the compression screw 24.

It will also be noted from FIGS. 4 to 6 that the carrier 44 includes a spine 52 extending along one edge thereof. As can be seen in FIGS. 4 & 5 defined within the interior of spine 52 is a channel 53 which receives wires 54 fixed to connectors 38, which wires 54 connect the piezoelectric elements 32, 33 & 34 to the instrument electronics (not shown). Vanes 55 are preferably formed on the inner surfaces to separate the individual wires 54 where they are fixed to connectors 38 thereby avoiding short-circuiting.

At assembly, the wires 54 are first fixed to connectors 38. The stack 22, temperature compensating components 39 & 40, and compression screw 24 are then laid in the carrier half 42 and the wires 54 located in channel 53.

Thereafter the carrier half 43 is brought into position and engaged with the half 42 to define the sub-assembly 44.

Upon assembly of the apparatus the sub-assembly 44 is offered up to cage 25 and the spine 52 is aligned with the slot 30. The sub-assembly 44 is then passed axially down into cage 25 until the threaded outer surface of compression screw 24 can be engaged with the threaded inner surface of collar 28. The compression screw is then tightened within the cage 25 using a tool appropriate for the turning arrangement provided on the end face of spigot 51. By way of example, this could be an Allen key, socket or screw driver.

In the event of failure of one of the components in the sub-assembly 44, the compression screw 24 is released allowing the entire sub-assembly 44 to be withdrawn and replaced.

The cage parts 42 and 43 are preferably moulded from a plastics material. In the case of the embodiment herein described, given the temperature variations which need to be accommodated, the cage parts 42 and 43 are moulded from a 30% glass-filled polyetheretherketone (PEEK) material. A range of other suitable materials will be readily ascertainable by those skilled in the art.

It will thus be appreciated that invention, at least in the case of the working embodiment described herein, provides a predetermined level detection transducer which, at least in the case of the embodiment just described, is configured to allow the piezoelectric elements to be readily replaced in the field and without breaching the integrity of the plant in which the apparatus is installed or requiring the plant to be drained.

The invention claimed is:

1. A vibrating element apparatus including:
   a wall section having an inner surface and an outer surface;
   a diaphragm defining, and closing one end of, said wall section, said diaphragm having an inner surface and an outer surface, the inner surfaces of said wall section and said diaphragm defining a hollow body;
   one or more vibrating elements extending from the outer surface of said diaphragm;
   a stack comprised of components which include one or more piezoelectric elements, said stack being located within said hollow body; and
   a compression device operable to compress said stack against the inner surface of said diaphragm;
   wherein said apparatus further includes a carrier which houses said stack and said compression device, said carrier being configured to fix the position of said stack with respect to said hollow body yet allow said compression device to rotate with respect to said stack (22), said carrier, said stack and said compression device being engageable with, and dis-engagement from said hollow body as a sub-assembly.

2. Apparatus as claimed in claim 1 wherein said carrier further houses at least one thermal compensation element.

3. Apparatus as claimed in claim 2 wherein said carrier includes a channel to house wires in electrical contact with said piezoelectric elements.

* * * * *